(12) United States Patent
Dickey et al.

(10) Patent No.: US 7,478,262 B2
(45) Date of Patent: *Jan. 13, 2009

(54) METHOD FOR ALLOWING DISTRIBUTED HIGH PERFORMANCE COHERENT MEMORY WITH FULL ERROR CONTAINMENT

(75) Inventors: Kent A. Dickey, Westford, MA (US); Michael L. Ziegler, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

This patent is subject to a terminal disclaimer.

(21) Appl. No.: 10/664,763

(22) Filed: Sep. 17, 2003

(65) Prior Publication Data

US 2004/0153842 A1 Aug. 5, 2004

Related U.S. Application Data

(63) Continuation of application No. 09/562,589, filed on Apr. 29, 2000, now Pat. No. 6,651,193.

(51) Int. Cl.
*G06F 11/00* (2006.01)

(52) U.S. Cl. .................. 714/4; 714/43; 714/48
(58) Field of Classification Search .................. 714/4, 714/43, 48
See application file for complete search history.

(56) References Cited

U.S. PATENT DOCUMENTS

| | | | |
|---|---|---|---|
| 3,229,251 | A | 1/1966 | Homan et al. |
| 5,675,807 | A | 10/1997 | Iswandhi et al. |
| 6,175,931 | B1 | 1/2001 | Hornung |
| 6,295,585 | B1 | 9/2001 | Gillett, Jr. et al. |
| 6,487,173 | B2 | 11/2002 | Tatsumi |

*Primary Examiner*—Michael C Maskulinski (57) ABSTRACT

The present invention provides for a method and system for ensuring error containment in packet based systems which are capable of large scaleability. In operation, an error bit travels with each data packet and if the bit is set any device which receives the data packet acts to contain that packet. Thus, the error message travels only as far as the error data and does not stop processing at locations not affected by the error. Any system resource, upon receipt of a set error bit, must act to correct the fault.

18 Claims, 9 Drawing Sheets

METHOD FOR ALLOWING DISTRIBUTED HIGH PERFORMANCE COHERENT MEMORY WITH FULL ERROR CONTAINMENT

CROSS REFERENCE TO RELATED APPLICATION

This is a continuation of application Ser. No. 09/562,589 filed on Apr. 29, 2000 which is hereby incorporated by reference herein now U.S Pat. No. 6,651,193.

TECHNICAL FIELD

The invention relates in general to error containment in computer systems, and in particular, to error containment for large scale, packet based systems.

BACKGROUND

Computer systems need to ensure that unexpected failures do not result in data being written to permanent storage without an error indication. If corrupted data are written to disk, for example, the application data can be corrupted in a way that could be nearly impossible to detect and fix.

Many containment strategies employed in computer systems are premised on the prevention of bad data infiltrating permanent storage. The usual way to prevent this is through a process called containment. Containment means that the error is contained to portions of the system outside of the disk. Typically, systems maintain containment by stopping all Direct Memory Access or "DMA" traffic after an error is signaled. More specifically, the standard technology for error containment in most bus-based computers is provision of a wire (or set of wires), which signal the errors among the devices on the bus. The error signal might be a special signal on the bus which all the bus agents can read, or a special transaction that is sent on the bus so that all units in the system may be notified. As such, units in the prior art detect the error signal within a cycle or two of the source unit asserting it. Thereafter, the receiving units perform whatever action is needed for containment.

The primary reason for effectuating error containment in this manner is that it is very inexpensive and relatively easy, given that it generally only requires one wire, all agents can read the error simultaneously, and act on it. Typically, such systems can also have different severities of error indicators when more than one wire is used. Most systems which utilize this type of error containment have at least one fatal error type indications which reflects that some containment has been lost, that both the normal system execution and DMA should stop, and the processor should go to recovery mode.

A large, distributed system cannot use this type of signaling, however. Too many dedicated wires are required to interconnect each component of the system, leading to a system which is too complex for routine use. As such, the prior art methodologies of the type described above are useful primarily for small scale system schemes which use dedicated wires to signal errors, and are not suitable for large scale situations. Further, timing problems result if prior art systems have different clock domains. Moreover, this type of error containment is not suited for use in systems which (1) are not on a shared bus system or (2) where cells or agents communicate on a packet basis. The prior art methodologies are not well suited to packet based systems because there is no simple way to propagate an error, given the use of a shared wire. If one were to implement the prior art methodology on a large distributed system, it would entail many shared wires with a central hub agent, collecting error information together and redistributing it. The end result of this is a structure that adds complexity to system infrastructure and is substantially more expensive than implementation thereof on a small scale busbased system.

Another potential solution taught in the prior art, for packet-based systems, is a special, packet type which indicates an error, which is then sent around the system to each agent with which the system was communicating. Such strategies, however, involve complexity in that they require the system to send an extra error indication packet, and require all the receivers to then act on the packet in a very specific way. As such, there is a need in the prior art for a practical, large scale methodology for error containment in packet-based communication systems between computers.

SUMMARY OF THE INVENTION

These and other objects, features and technical advantages are achieved by a system and method which is generally directed to a simple mechanism for use by a distributed system as an error indication in an existing protocol packet, for informing receiving units in a distributed system that a particular unit may have corrupted data. Proper handling by receiving units of the inventive indication prevents corrupted data from being propagated to a permanent storage medium, thereby maintaining containment.

The invention provides containment for, e.g., arbitrary usage patterns, when preferably installed within the framework of directory based coherent systems, and requires no application level code changes, and can be implemented completely in the fabric without any changes to the processor core. In order to accomplish this, the present invention preferably uses a fixed position bit in the packet header to indicate an error status of the source in a non bit or hardware intensive manner. The protocols of the invention are further defined in such a way that all receivers of packets must respond to packets with this error indicator in order to achieve containment. The invention thus forces a system to pass on an error indication to other receiving units and requires the CPU to both stop processing and to implement the recovery handler in order that the packets can flow freely.

This methodology provides for error containment by using just one bit in the packet header. As a result, there is no need to install wires or to involve other cumbersome prior art structures in order to provide effective error containment. By using a bit which is already used to communicate between units in the protocol, a scalable, simple error containment strategy results. Moreover, the invention is easily expanded to provide containment for less severe errors, such as those involving shared memory regions used between systems in high-speed communications. Because the data being processed within the system can never be processed by an agent which does not read the error indication on the data, the present invention provides for near perfect containment, and offers flexibility for a system such that it can be scaled up to larger numbers of units easily.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Figure 1:
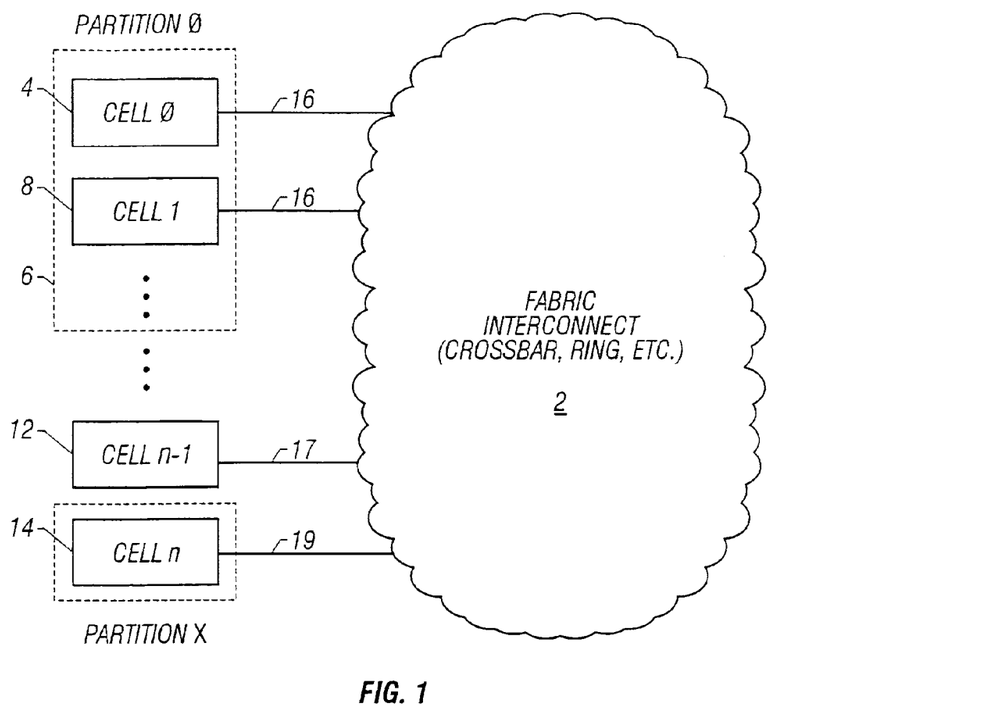
FIG. 1 depicts a high level exemplary block diagram of a cell topology, in connection with a fabric interconnect.

The inventive system and method is best adapted for use on an inventive cell topology in connection with a fabric interconnect such as that shown in FIG. 1, which depicts a high level exemption block diagram forming a preferred environment in which the inventive system and method is situated. By way of overview, a large computer system is divided into partitions 0-x (represented at 4), which are connected via a fabric interconnect 2, which may be either a 2 ring topology base, a crossbar base, etc., as are known in the art of networking.

Figure 2:
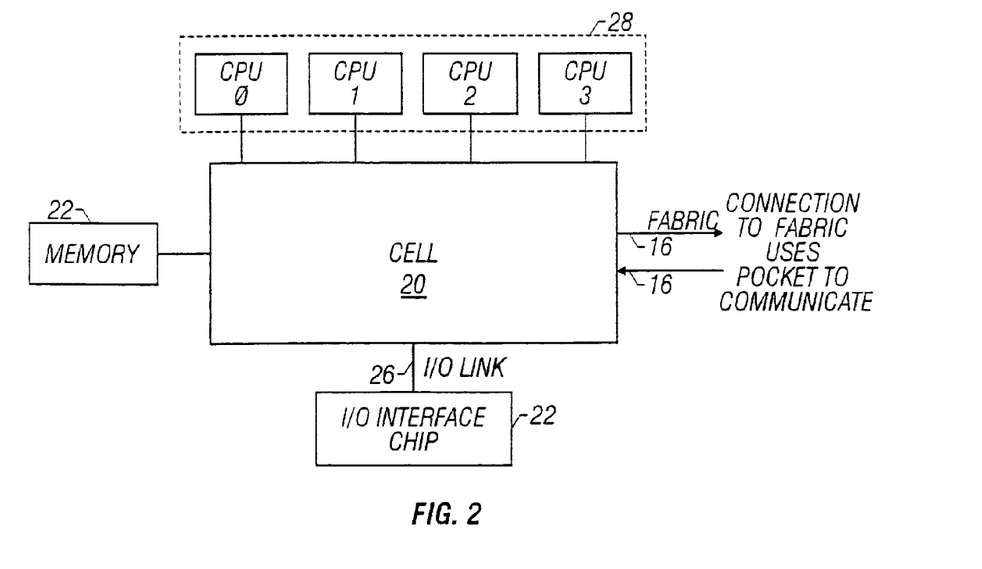
FIG. 2 depicts an exemplary block diagram of a cell module forming a subject partition.

With reference to FIG. 2, each partition 4, 6, will be made up of at least one cell 20 so that there will be a plurality of cells, numbered 0 through n. Although the variations in specific architecture are virtually unlimited, and are generally tailored to specific needs, by way of simple illustrative example, one might have a system such as that depicted in FIG. 1, having a plurality of partitions such that partition 0, located at 4, is connected to partition x, located at 6, via connection 16 to fabric 2 through connection 19. In this embodiment, partition 0 has two cells, cell number 0 located at 8, and cell number 1 located at 10. Independent of either of these partitions is cell number n-1, located at 12, which is connected to partition 0 through connection 17 via fabric 2 to connection 16. Similarly, cell number n-1, located at 12, is connected to partition x, located at 6, through connection 17 via fabric 2 through connection 19. Ultimately, any given cell 20 may try to communicate with any other cell 20, whether within a common partition, or without.

Figure 3:
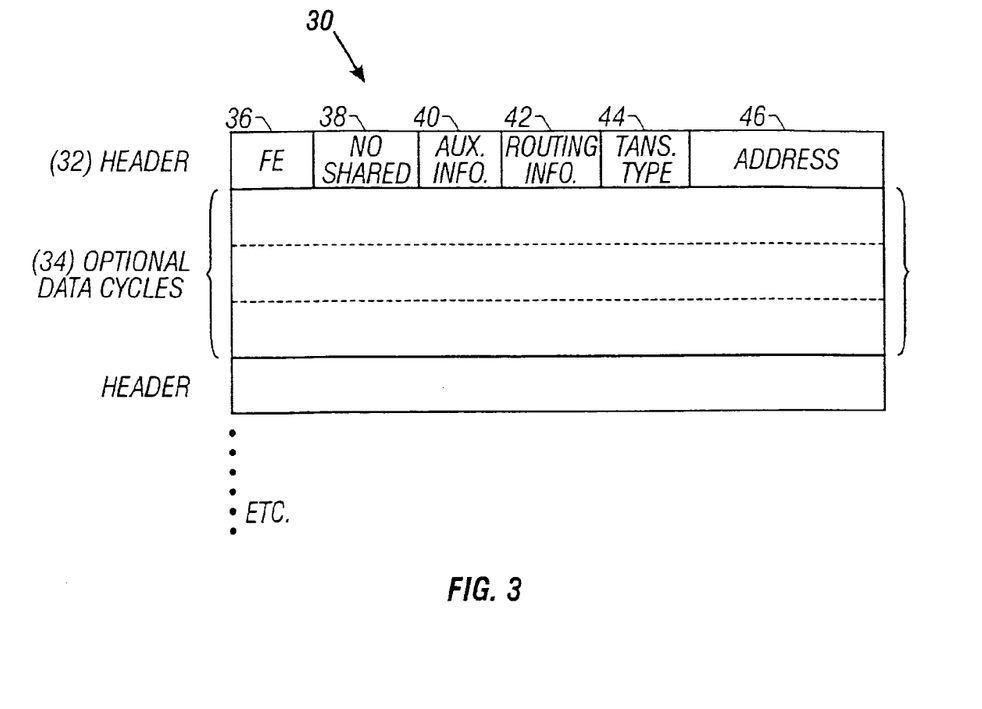
FIG. 3 depicts a preferred format for an inventive fabric packet.

When communicating via fabric 2, the preferred embodiment will utilize a fabric packet 30 in the format depicted in FIG. 3, which will most preferably be bifurcated into a header 32 and (optional) data cycles 34. Within header 32, the preferred information will comprise fatal error bit 36 to indicate the presence of a fatal error; no-shared bit 38 for indicating non-shared resources; source ID information bit 40, which is particularly useful for identifying the inventive processor ID number; auxiliary information 42; transaction type 44, which will detail information relating to whether there is a read or a write, etc.; and address 46, which will detail information relating to where the packet is going to.

Typically, fabric packet 30 must pass through some level of firewall (not pictured) when passing from an outside partition or cell. Nevertheless, the inventive methodology and apparatus is most preferably situated at the individual cell level, as depicted in FIG. 2. Specifically, cell 20 is connected to fabric 2 via connections 16 which receive and send fabric packet 30 and interrupt packet 50. Cell 20 also has an I/O link 26, which is for connection to an I/O interface chip 24. Also provided with cell 20 is memory 22. As mentioned, cell 20 may be a subunit of a given partition, but an individual cell 20 may be further divided into a processor grouping 28 which has any number of CPUs as need according to individual specifications known in the art.

The present invention preferably resides within the environment of a large distributed system, which consists of a building block or a cell, which contains processors and a memory unit, connected through a fabric which interconnects the cells. The fabric consists of a cross-bar and other types of links to build large-scale systems. The communication between cells is limited to a packet-type protocol into which all of the system communication fits. The communication has memory requests, memory data returns and all manner of elements needed to build a fully-coherent shared memory computer system. The invention preferably provides for a fixed-bit position in the packet header to indicate the error status of the source. The inventive protocol is preferably defined in such a way that all receivers of packets now have to act on packets with this error indicator in order to achieve containment. The error indicator representing possibly corrupted data, is passed around and in a most preferred embodiment, is termed a Fatal Error Bit 36 (in FIG. 3). In an alternative preferred embodiment, Fatal Error Bit 36 might be collapsed into a different type of encoding within the packet header, or even into an encoding situated within a packet trailer. By way of even further alternative preferred embodiments, Fatal Error Bit 36 might be encoded into alternate encoding such as a side band signal during data transfers; an Error Correcting Code "ECC" pattern with the data cycles; or a cell might even consist of 0 memory units, 0 processor interfaces, and/or 0 Direct Memory Access ("DMA") interfaces.

A fatal error is usually defined to mean an error resulting in a possibly corrupt machine state such that contained normal operation is not possible. For purposes of this patent, the error is handled by considering all of memory to be possibly corrupted, and so outgoing DMA should be halted. This severity can be compared with a less severe error, say a memory double-bit error, where the corruption can be localized to a single address, and can be handled with less severe measures. For instance, a fatal error might result from a bus parity error, and if a given system receives a bus parity error during a valid transaction, the system does not recognize what the intended address is nor that the address is now corrupt. Given that further processing would necessarily corrupt data, the system must stop processing the associated traffic. In order to provide for the proper handling of these types of errors, the invention is preferably directed to providing fatal error containment at the cell level by utilizing an absolute rule that a unit in a given system which receives a packet with the Fatal Error Bit 36 set is responsible for maintaining containment of the error. For a processor device, the receiving cell must notify the processor (usually through a pre-defined bus protocol) of a fatal error before passing on to the processor any information from a packet with Fatal Error Bit 36 set. Once notification has been given, traffic can proceed normally, since the processor can guarantee it will begin executing recovery code immediately. This provides the cell logic to avoid the necessity of dropping packets or the need to do additional special handling (other than to give the error notification). For an I/O device, the receiving cell will need to stop all outgoing data traffic to the I/O system upon receiving a packet having Fatal Error Bit 36 set, including stopping of the packet with Fatal Error Bit 36 set. By stopping all traffic, containment is achieved, given that no more data will flow out to the I/O devices.

The error notification therefore propagates as far as the potentially corrupt data propagates. As a result, any unit which comes in contact with any cell which has entered this fatal error mode will also enter fatal error mode. Instead of sending a specialized message indicating the fatal error status, the error indication is included in every packet and as such, is automatically sent to all the cells with which this cell communicates without any additional effort. The invention avoids the complexity associated with broadcasting a special error indication packet involved in sending the error indication via packets being generated through normal traffic (e.g., complexity regarding: how to insert the special error indication before other traffic; how to handle flow-control corner cases; how to determine to which cells to send the special error indication? etc.). Thus, no special broadcast needs to be done; something which greatly simplifies the error protocol.

Accordingly, the present invention provides a way for the chipset logic outside the core processor logic to provide error containment on top of the normal coherency protocol. As mentioned, the invention assumes, in a preferred embodiment, a cell-based computer system, where each cell consists of at least one memory controller unit, at least one processor interface unit, and at least one DMA interface unit. All the units might be on one chip, or might be spread across several chips, but in the preferred embodiment, will put most functions (i.e., units) onto a single chip. Hence, in the preferred embodiment, a cell consists of two memory units, one DMA interface unit, and four processor interface units. Most preferably than a basic shared memory coherency protocol exists for using a protocol with the "packets", as seen in FIG. 3, where the present invention dedicates a bit in every packet in the protocol for the encoding of a Fatal_error mode.

Figure 4:
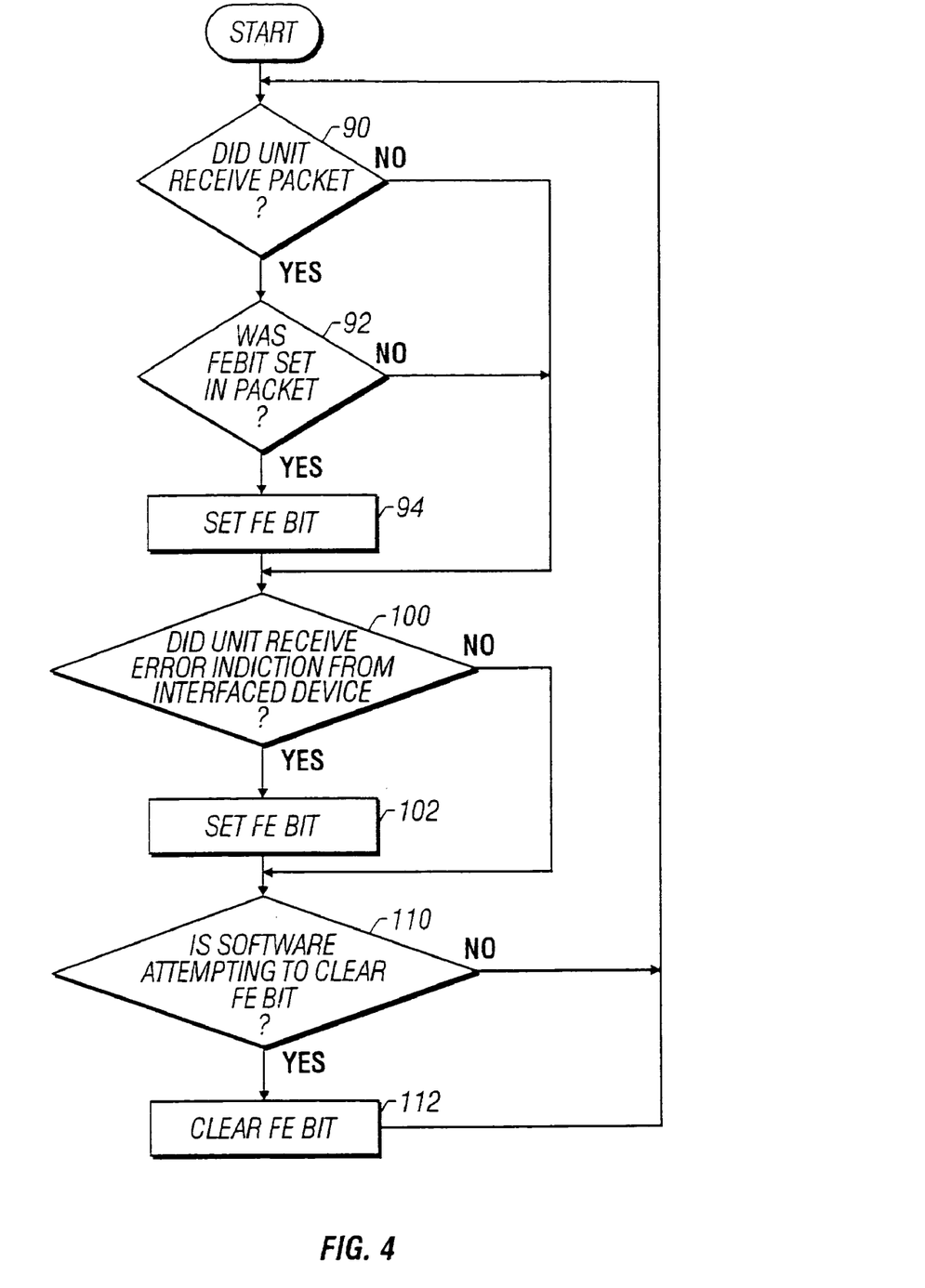
FIG. 4 depicts a flow diagram representing the preferred fatal error bit logic at the DMA interface processor interface and memory unit.
Figure 5:
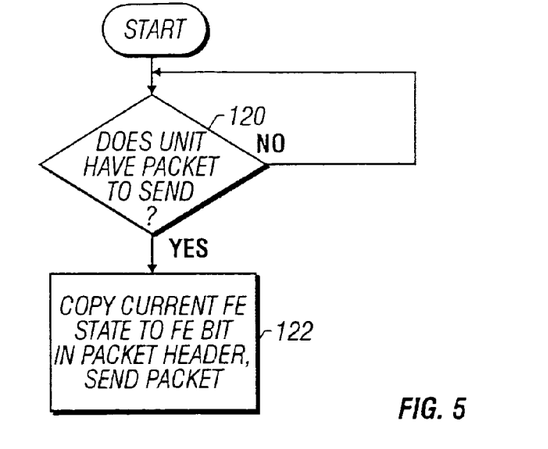
FIG. 5 depicts a flow diagram representing the preferred packet generation logic at all interfaces.
Figure 6:
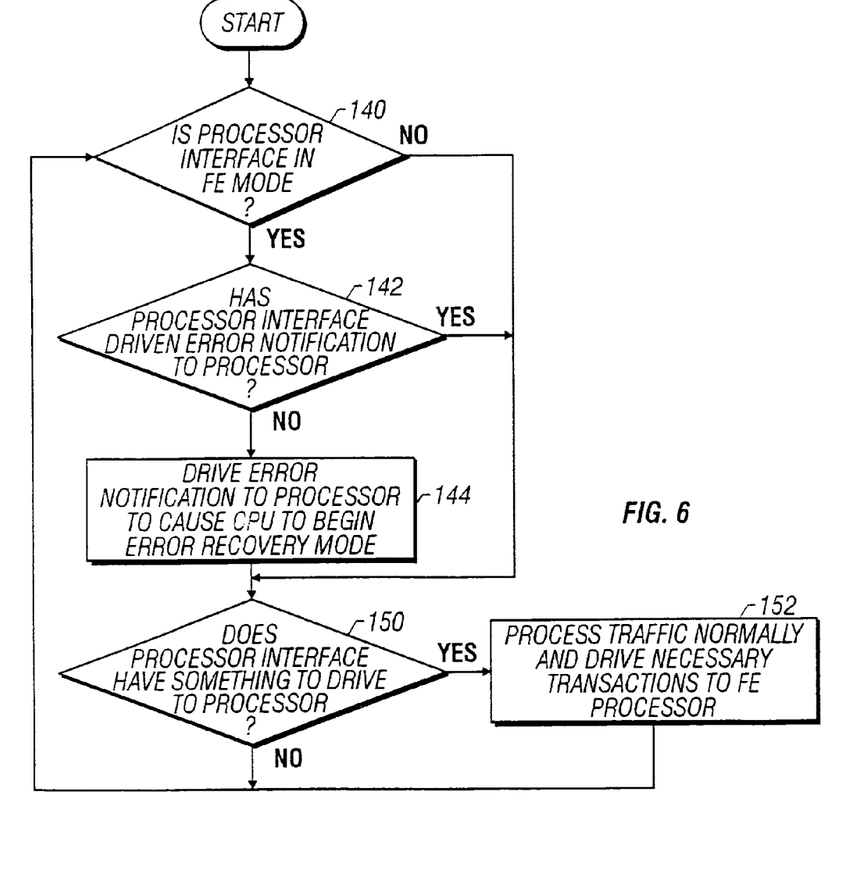
FIG. 6 depicts a flow diagram representing a processor interface logic (for a fatal error mode)
Figure 7:
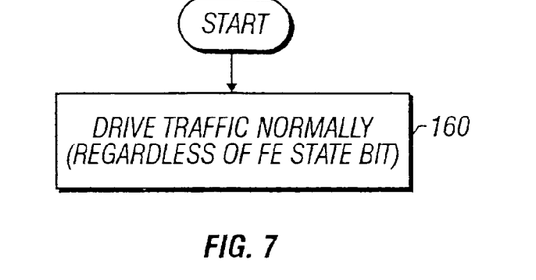
FIG. 7 depicts a flow diagram representing a memory interface logic (for a fatal error mode)

FIGS. 4-13 are portions of flow diagrams representative of a preferred embodiment of the invention relating to packet based error containment which will be used to discuss the various inventive states and procedures. More specifically, every unit, (i.e., cell 20) is a source of packets in the system which has two indicator states which it can be in: Normal mode and Fatal_error mode. In Normal mode, all traffic operates normally. As seen in FIG. 4, a unit receives a packet at 90, and then, if a unit is in Fatal_error mode (detected at 92), it will set the Fatal_error bit at 94 and 102. A unit enters Fatal_error mode when it detects a possible data corruption error (such as an uncorrectable ECC error, a detected protocol error, etc.), or if it receives a packet with the Fatal_error bit set at 92 and 104. Once a unit enters Fatal_error mode, it stays in that mode until a software recovery routine clears it at 110, 112. For the best containment, a unit, as seen in steps 120, 122 of FIG. 5, preferably drives its current state in the packet header bit for all packets it generates. Turning to FIG. 6, when a processor interface unit transitions from Normal to Fatal_error mode at 140, 142, it is useful to drive an error indication to the processor, as seen at 144, 152. This error indication can be an interrupt, a special error transaction, or a side-band signal and this signal will make the CPU (processor) begin executing an error recovery routine beginning at 144, and for driving to the processor at 150. Although executing this routine is not generally required for containment, it is employed in an especially preferred embodiment, as it is useful for diagnostic purposes.

Figure 8:
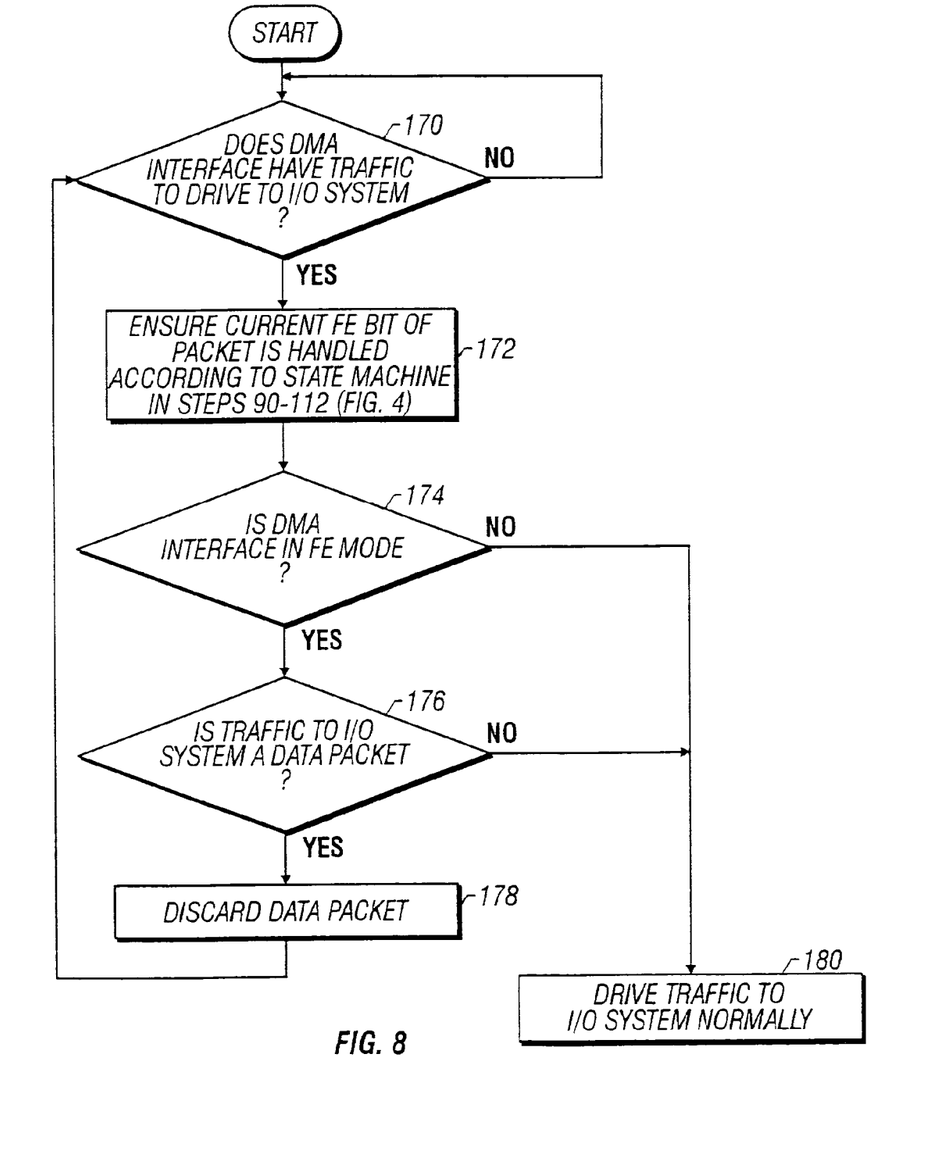
FIG. 8 depicts a flow diagram representing a DMA interface logic (for a fatal error mode)
Figure 9:
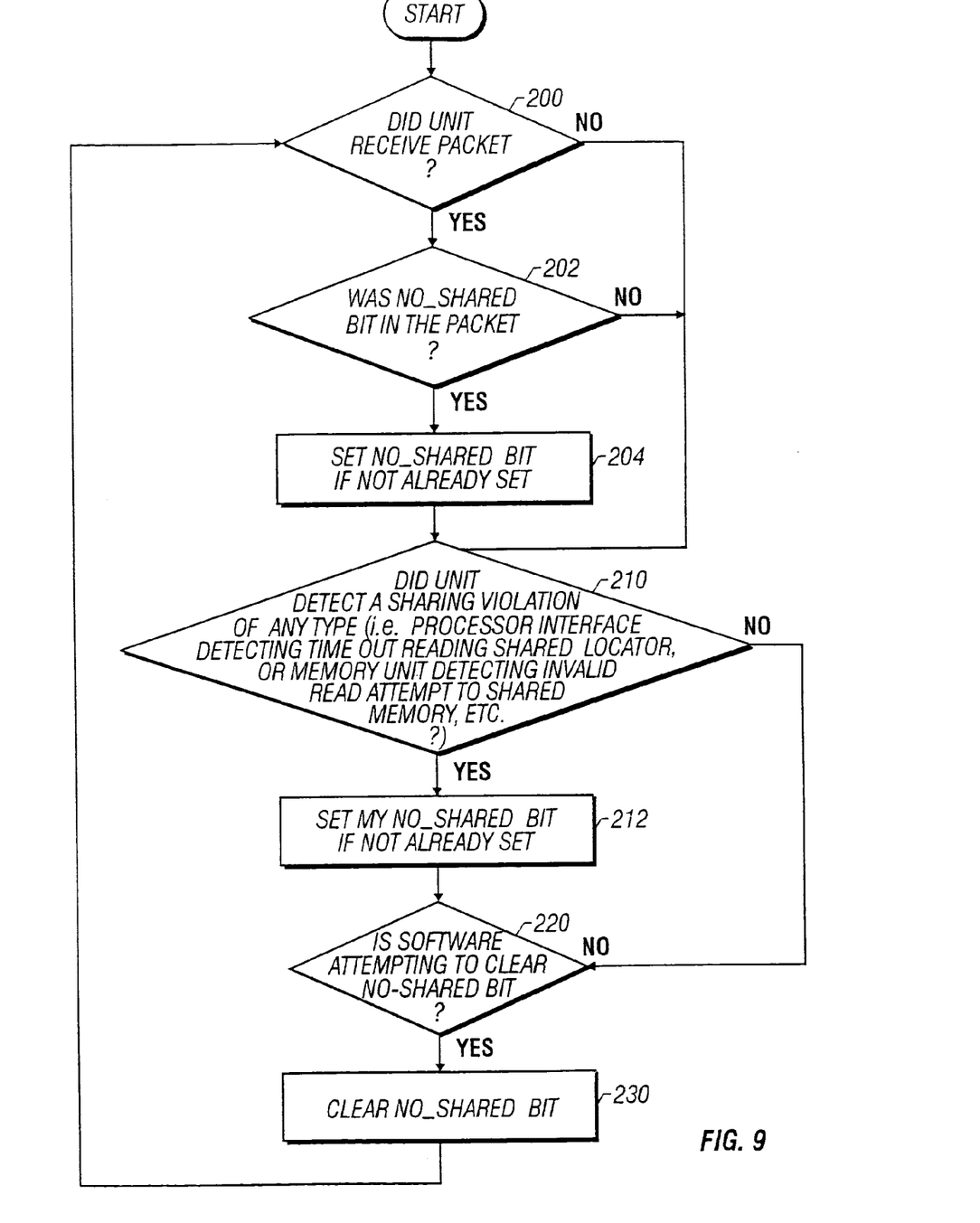
FIG. 9 depicts a flow diagram representing a No_shared bit logic at DMA interface, processor interface, and memory unit.
Figure 10:
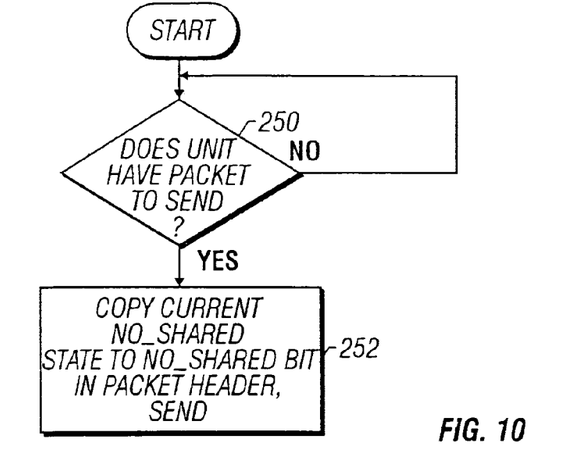
FIG. 10 depicts a flow diagram representing a packet generation logic at all interfaces.
Figure 11:
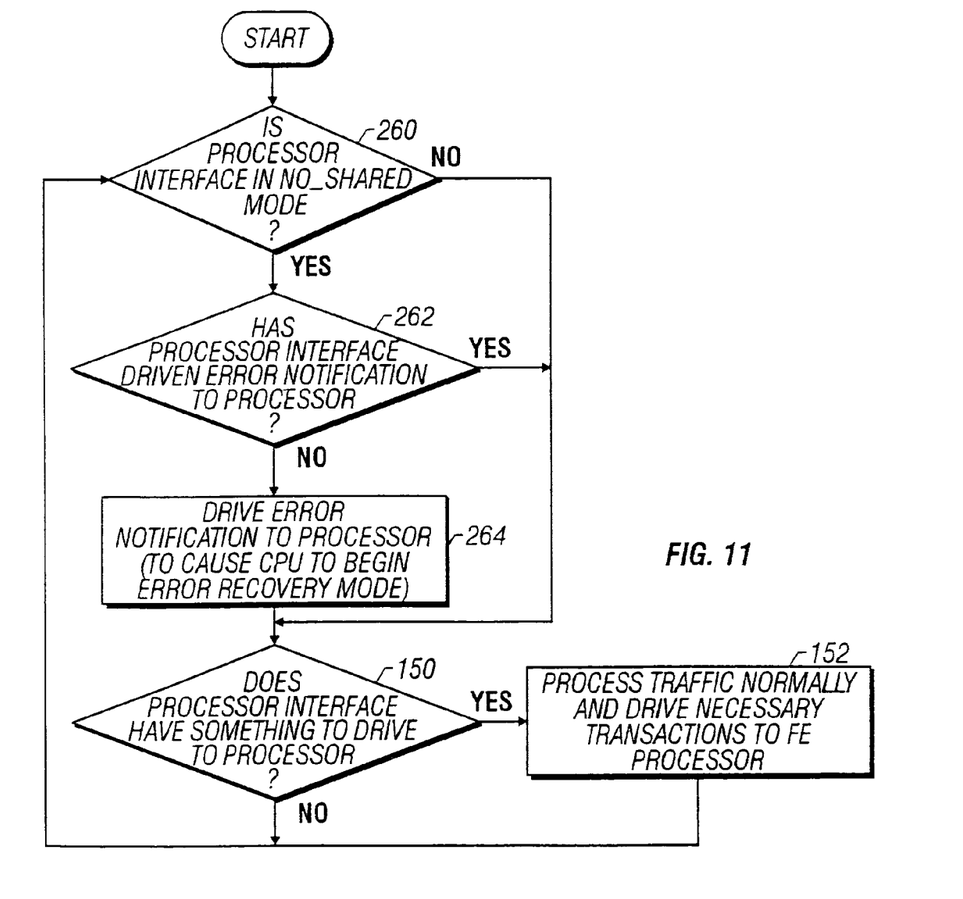
FIG. 11 depicts a flow diagram representing a processor interface logic (for a No_shared mode)
Figure 12:
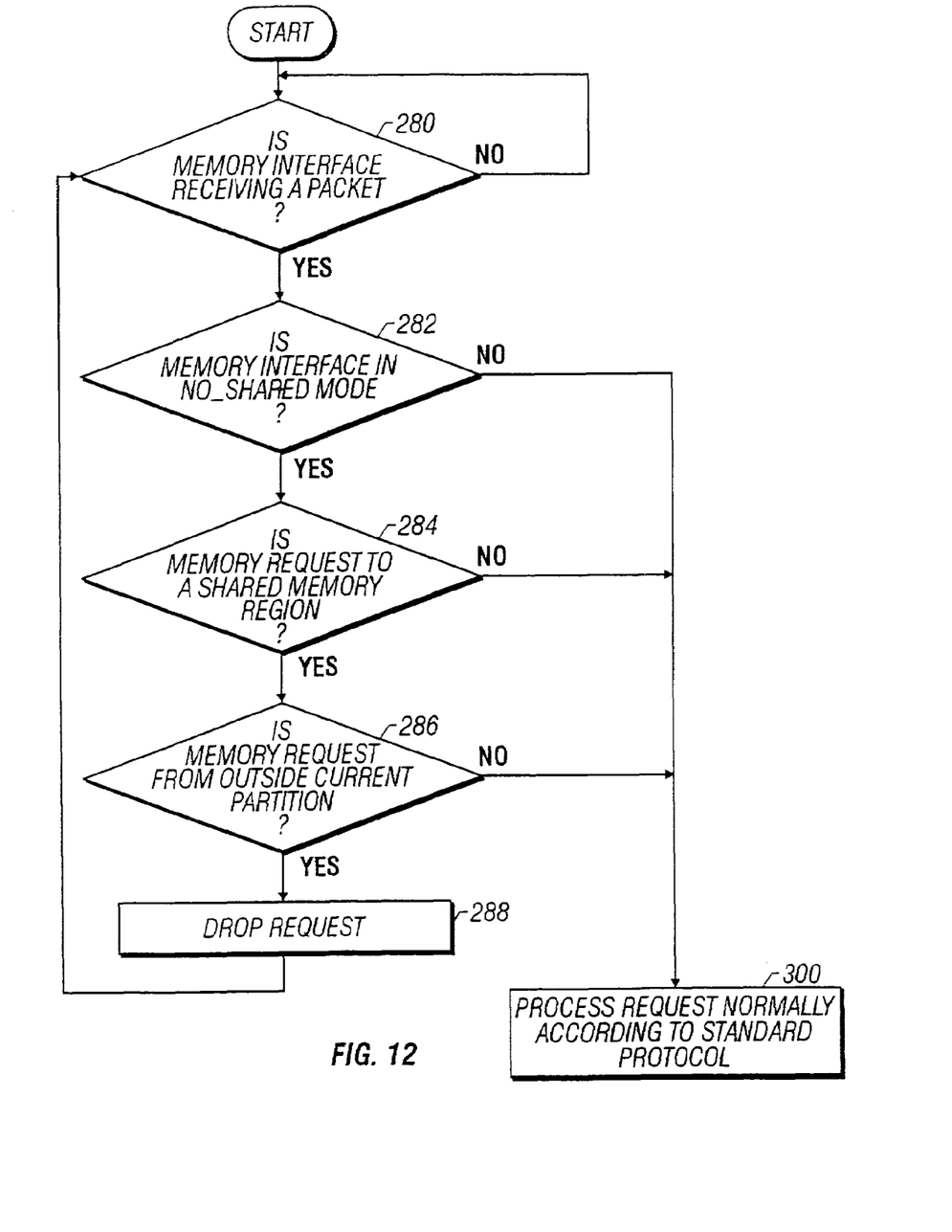
FIG. 12 depicts a flow diagram representing a memory interface logic (for a No_shared mode)
Figure 13:
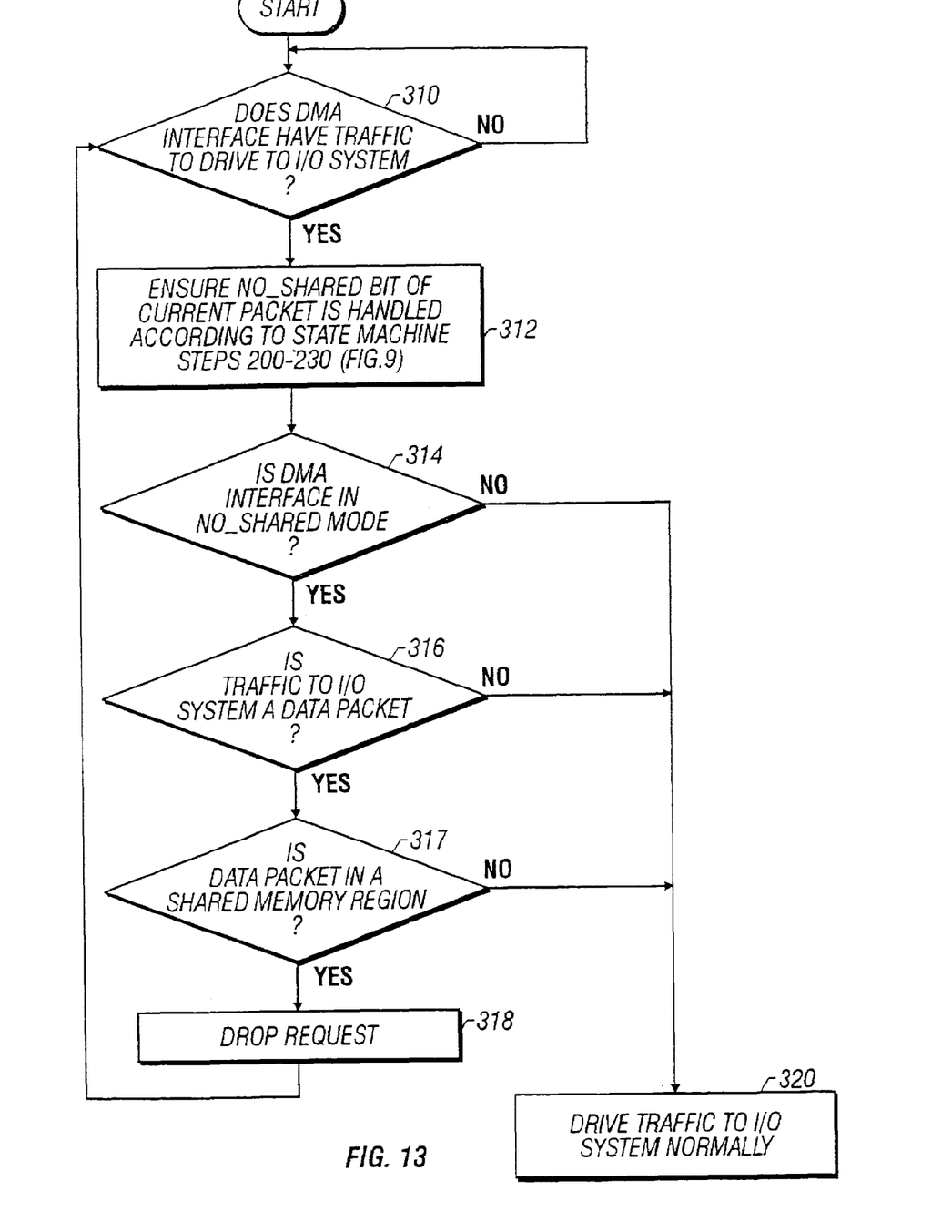
FIG. 13 depicts a flow diagram representing a DMA interface logic (for a No_shared mode).

As generally seen in FIG. 8, when a memory unit enters Fatal_error mode, it may optionally discard some packet types such as mew read requests if it helps speed recovery to avoid system timeouts. More specifically, when say, a DMA has traffic which it needs to drive to the I/O system at 170, the system will ensure at 172 that the current FE bit of the packet is handled according to the steps 90-112 in FIG. 4. Accordingly, the DMA unit verifies Fatal_error mode at 174. In doing so, the invention ensures that no corrupt data leaves the system heading towards the I/O at 176, by dropping at 178 all traffic heading outbound towards the I/O system, or by tagging the data with an error indication, such as a parity error on an I/O bus, in order to prevent consumption of the bad data by an I/O device. The dropping of traffic or marking of data as bad maintains the integrity of data stored on all I/O devices. Hence, the Fatal_error notification propagates like a virus through the system. Although units may receive packets with the error indication at varying times, no potentially corrupt data can leave the system since the DMA unit is preventing all suspect data from leaving by dropping the traffic or marking the data as corrupt as described above. Units which are prompted to pass corrupt data around pass the virus with the data, thereby ensure containment across all possible arcs between units.

In an especially preferred embodiment, the invention may be expanded by providing for another bit to be added to indicate whether special shared memory regions are intact, as seen generally in FIGS. 9, 10, 11, 12, and 13. These shared memory regions were memory areas shared between independent systems over a coherent infrastructure using the same packet protocol as within one system such as the cells 8, 10, 12, and 14 (depicted in FIG. 1). This extra bit, called the No_shared bit, indicates whether there is any corrupted data in a shared region. Once this particular bit is detected, a separate protocol is invoked to maintain a consistent shared memory view. This is done by having a second state bit inserted per each interface. This second state bit is called the "No_shared" state. When set as such, this bit indicates that the shared memory region is potentially corrupt and cannot be trusted. Each interface generally runs the preferred algorithm (depicted in FIG. 9) to track the No_shared bit. By using just one more bit in the packet header with logic very similar to that used for the fatal error bit (in FIGS. 4-8), error containment can be maintained even for arbitrary sharing regions between partitions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing a distributed high performance coherent memory with error containment, comprising the steps of:
    reading an error indication included in a data packet, reflective of a current state of a unit;
    determining if said current state of said unit is in error mode;
    permitting a network traffic set to operate in a normal state if said current state of a unit is not in error mode;
    driving an error indicator to a subject processor if said current state of unit is in error mode;
    ensuring that each member of a group of connected units, reads said error indication included in said data packet, if said current state of a unit is in error mode; and
    ensuring that corrupt traffic set does not reach an I/O device if said state of said unit is in error mode.

2. The method of claim 1 further including the step of:
    ensuring that each member of said group of connected units having at least one connected unit passes said error indication included in said data packet if said current state of a unit is in error mode to a next member of said group of connected units.

3. The method of claim 1 wherein said error indication in said data packet is in the form of an error bit.

4. The method of claim 1 wherein said error indication in said data packet contained within a header of said data packet.

5. The method of claim 1 further comprising the step of:
    implementing a recovery routine by said subject processor.

6. The method of claim 1 wherein said reading step includes reading said error indication from an error bit.

7. The method of claim 1 further comprising the step of:
    implementing a software recovery routine to clear said error mode.

8. The method of claim 1, further comprising the step of:
    setting a shared memory error bit to be included in said data packet as representative of a presence of an error in a shared memory area.

9. The method of claim 8, wherein said error bit is provided as a fatal error bit.

10. The method of claim 8, wherein said error bit is provided as a shared memory bit, and wherein said unit comprises a shared memory area.

11. A distributed high performance coherent memory module with error containment, comprising:
    a reading module for reading an error indication included in a data packet reflective of a current state of a unit;
    a determination module for determining if said state of a unit is in error mode;
    a permission module for permitting a set of network traffic to operate in a normal state if said state of said unit is not in error mode;
    a driving module for driving an error indicator to a subject processor if said state of said unit is in error mode;
    a blocking module for ensuring that a set of corrupt traffic does not reach I/O devices if said current state of unit is in error mode; and
    a second reading module for ensuring that each member of a group of connected units reads said error indication included in said data packet, if said state of said unit is in error mode.

12. The module of claim 11 further comprising:
    a passing module for ensuring that each member of a group of connected units passes said error indication included in said data packet, if said current state of a unit is in error mode, to a next unit member of group of connected units having at least one connected unit.

13. The module of claim 11 further comprising an error indication module for providing an error indication to be included in said data packet reflective of the current state of a unit.

14. The module of claim 11 further comprising:
    a processor recovery module for implementing a recovery routine by said subject processor.

15. The module of claim 11 further comprising:
    a unit recovery module for implementing a software recovery routine to clear said error mode from said unit.

16. The module of claim 11 further comprising:
    a shared memory error module for setting a shared memory error bit to be included in said data packet for representing the presence of an error in a shared memory area.

17. The error indication module of claim 11 further comprising:
    a shared memory bit module therein for providing a shared memory bit within said error indication and further comprising a shared memory area within said unit; and
    means for moving said error indication coextensive only with errors in particular data.

18. A system for error containment, said system comprising:
    means for transporting error indications together with data which is in error;
    means at each device to which such error data is directed and controlled in part by said error indicators for containing within said device said error; and
    means for propagating said error indications to next ones of said devices to which said error data must be delivered, said propagating occurring concurrently with error data delivery.

* * * * *

UNITED STATES PATENT AND TRADEMARK OFFICE
CERTIFICATE OF CORRECTION

PATENT NO. : 7,478,262 B2  Page 1 of 1
APPLICATION NO. : 10/664763
DATED : January 13, 2009
INVENTOR(S) : Kent A. Dickey et al.

It is certified that error appears in the above-identified patent and that said Letters Patent is hereby corrected as shown below:

In column 8, line 56, in Claim 18, after "error" insert -- data --.

Signed and Sealed this

Nineteenth Day of May, 2009

JOHN DOLL
*Acting Director of the United States Patent and Trademark Office*